(12) United States Patent
Kim et al.

(10) Patent No.: US 7,972,724 B2
(45) Date of Patent: Jul. 5, 2011

(54) NEGATIVE ELECTRODE FOR LITHIUM SECONDARY BATTERY AND LITHIUM SECONDARY BATTERY COMPRISING SAME

(75) Inventors: Sung-Soo Kim, Suwon-si (KR);
Goo-Jin Jeong, Suwon-si (KR);
Min-Seok Sung, Suwon-si (KR);
Yoshiaki Nitta, Fukui (JP)

(73) Assignee: Samsung SDI Co., Ltd., Yongin-si (KR)

( * ) Notice: Subject to any disclaimer, the term of this patent is extended or adjusted under 35 U.S.C. 154(b) by 302 days.

(21) Appl. No.: 11/506,466

(22) Filed: Aug. 18, 2006

(65) Prior Publication Data
US 2007/0059604 A1 Mar. 15, 2007

(30) Foreign Application Priority Data
Aug. 19, 2005 (KR) .................. 10-2005-0076209

(51) Int. Cl.
H01M 4/02 (2006.01)
H01M 4/04 (2006.01)
H01M 4/13 (2010.01)
H01M 4/58 (2010.01)
H01M 4/139 (2010.01)
H01M 10/00 (2006.01)
H01M 10/52 (2006.01)

(52) U.S. Cl. ........... 429/209; 429/218.1; 429/231.95; 429/122; 29/623.5

(58) Field of Classification Search ............ 429/212, 429/217, 233, 245, 218.1, 209, 122, 188; 338/324, 328; 29/2, 623.1–623.5
See application file for complete search history.

(56) References Cited

U.S. PATENT DOCUMENTS

| 4,315,975 | A | * | 2/1982 | Sekido et al. | 429/323 |
| 5,498,490 | A | * | 3/1996 | Brodd | 429/149 |
| 5,589,297 | A | * | 12/1996 | Koga et al. | 429/212 |
| 6,235,427 | B1 | * | 5/2001 | Idota et al. | 429/218.1 |
| 6,531,950 | B1 | * | 3/2003 | Becker et al. | 338/22 R |
| 2002/0086215 | A1 | * | 7/2002 | Tamura et al. | 429/245 |
| 2004/0002002 | A1 | * | 1/2004 | Mizuta et al. | 429/188 |

FOREIGN PATENT DOCUMENTS

| JP | 10149810 A | * | 6/1998 |
| JP | 2000133274 A | * | 5/2000 |
| KR | 10 2001 0001828 A | | 1/2001 |

OTHER PUBLICATIONS

Machine Translation and Abstract in English of JP2000-133274.*
Machine Translation & Abstract in English of JP 10-149810.*
Korean Patent Abstracts, Publication No. 10-2001-0001828A, Jan. 5, 2001.

* cited by examiner

*Primary Examiner* — Dah-Wei D Yuan
*Assistant Examiner* — Claire L Roe
(74) *Attorney, Agent, or Firm* — Christie, Parker & Hale, LLP

(57) ABSTRACT

A negative electrode for a lithium rechargeable battery is provided. The negative electrode includes a current collector, a thermosetting resin layer disposed on the current collector, and a negative active material layer disposed on the thermosetting resin layer. Metal ions in the current collector are diffused into the thermosetting resin layer, creating a concentration gradient of metal ions in the thermosetting resin layer. The metal ions diffused into the thermosetting resin layer react with the thermosetting resin to form metal compounds.

16 Claims, 4 Drawing Sheets

NEGATIVE ELECTRODE FOR LITHIUM SECONDARY BATTERY AND LITHIUM SECONDARY BATTERY COMPRISING SAME

CROSS-REFERENCE TO RELATED APPLICATION

This application claims priority to and the benefit of Korean Patent Application No. 10-2005-0076209 filed in the Korean Intellectual Property Office on Aug. 19, 2005, the entire content of which is incorporated herein by reference.

FIELD OF THE INVENTION

The present invention relates to negative electrodes for lithium rechargeable batteries and to lithium rechargeable batteries comprising the same. More particularly, the present invention relates to negative electrodes having improved adhesion between the current collector and the negative active material layer, and to negative electrodes capable of improving the cycle-life characteristics and safety of the battery.

BACKGROUND OF THE INVENTION

Lithium rechargeable batteries have recently drawn attention as power sources for small, portable electronic devices. Lithium rechargeable batteries use organic electrolytic solutions and have discharge voltages twice as great as conventional batteries using alkaline aqueous solutions, and therefore have high energy density.

A rechargeable battery can have various shapes, for example the battery can be cylindrical, prismatic, or the like. The rechargeable battery is generally fabricated by housing an electrode assembly (in which a separator is positioned between bar-shaped positive and negative electrodes) in a case and mounting a cap assembly having an outer terminal on the case. The positive and negative electrodes include coated regions and uncoated regions. The coated regions are formed by coating a current collector with an active material. A conductive tab is mounted on the uncoated region. The conductive tab collects current generated from the positive and negative electrodes. The conductive tab is fixed to the electrode assembly by welding or the like, and collects and guides the current generated from the positive and negative electrodes to positive and negative outer terminals.

Positive and negative electrodes of the lithium rechargeable battery are fabricated by coating an active material composition on a current collector. The active material composition includes an active material and a binder for attaching the active material to the current collector. The binder is included to promote adhesion and attachment of the active material to the current collector.

The adhesion and attachment of the active material to the current collector by the binder critically influences long-term cycle-life characteristics of lithium rechargeable batteries. When the binder has low adhesion, the active material can detach from the current collector during long term use of the battery. Accordingly, adhesion of the active material to the current collector relies on the binder providing adhesion and attachment of the active material to the current collector.

The binder may be a polymer binder, for example a fluorinated resin such as polyvinylidene fluoride, polytetrafluoroethylene, and the like. Alternatively, the binder may be a styrene-butadiene rubber or the like. Of these binders, polyvinylidene fluoride is generally known to impart stronger adhesion of the active material, and is therefore widely used.

However, when only polyvinylidene fluoride is used as the binder, lithium in the active material undergoes a non-reversible reaction with the fluorine group in the binder. This reaction produces LiF upon charging and discharging of the lithium rechargeable battery, thereby reducing the amount of lithium available for charge-discharge of the lithium rechargeable battery and decreasing battery efficiency. Accordingly, there is a need for a binder that can improve adhesion of the active material to the current collector.

The information disclosed in this Background section is presented to further the understanding of the present invention. Applicant does not admit that all information disclosed in this Background section is prior art to the present invention.

SUMMARY OF THE INVENTION

In one embodiment of the present invention, a negative electrode for a lithium rechargeable battery has improved adhesion between the current collector and the negative active material layer, and is capable of improving the cycle-life characteristics and safety of the battery.

In another embodiment of the present invention, a method of preparing the above negative electrode is provided.

In yet another embodiment of the present invention, a lithium rechargeable battery includes the above negative electrode.

According to one embodiment of the present invention, a negative electrode for a lithium rechargeable battery includes a current collector, a thermosetting resin layer disposed on the current collector, and a negative active material layer disposed on the thermosetting resin layer.

Nonlimiting examples of the current collector include copper foil, nickel foil, stainless steel foil, titanium foil, nickel foam, copper foam, polymer substrates coated with conductive metals, and combinations thereof.

Nonlimiting examples of suitable thermosetting resin layers include polyimide, polyurethane, epoxy resins, nylon, and combinations thereof.

When the thermosetting resin layer is formed, metal ions in the current collector are diffused into the thermosetting resin layer resulting in a concentration gradient of metal ions.

The metal ions at the interface between the current collector and thermosetting resin layer are present in an amount ranging from about 0.001 to about 0.1 wt % based on the total weight of the thermosetting resin layer. The metal ions are present in a concentration gradient in which the amount of metal ions diminish from the interface between the current collector and the thermosetting resin layer to the interface between the thermosetting resin layer and the active material layer. The metal ions diminish in the concentration gradient at a rate ranging from about 0.0001 to about 0.002 wt %/nm.

The metal ions diffused into the thermosetting resin layer react with the thermosetting resin to form metal compounds. The metal compounds decrease the surface roughness at the interface between the current collector and the thermosetting resin layer. The surface roughness at the interface between the current collector and the thermosetting resin layer ranges from about 0.01 to about 5 µm.

Nonlimiting examples of suitable materials for the negative active material layer include lithium, metals alloyed with lithium, carbonaceous materials, and composite materials of metals and carbonaceous materials.

According to another embodiment of the present invention, a method of preparing a negative electrode for a lithium rechargeable battery includes coating a composition for forming a thermosetting resin layer on a current collector to form a thermosetting resin layer. The method further includes coating a negative active material slurry on the thermosetting resin layer to fabricate a negative electrode.

According to yet another embodiment of the present invention, a lithium rechargeable battery includes the above described negative electrode, a positive electrode including a positive active material, and an electrolyte.

BRIEF DESCRIPTION OF THE DRAWINGS

These and other features and advantages of the present invention will be better understood by reference to the following detailed description when considered in conjunction with the accompanying drawings in which.

DETAILED DESCRIPTION OF THE INVENTION

In general, conventional electrodes for lithium rechargeable batteries are fabricated by coating a conductive metal current collector (such as nickel, aluminum, copper, or stainless steel foil or mesh) with an active material layer. However, adhesion of the current collector to the active material layer is often poor, resulting in the detachment of the active material layer from the current collector through expansion and contraction of the active material layer during charge and discharge of the battery. This results in deteriorations in battery performance.

Particularly, in prismatic lithium rechargeable batteries that do not have relatively uniform pressure from their battery cases, adhesion of the active material layer to the current collector is very important.

According to one embodiment of the present invention, a thermosetting resin (such as polyimide) having high thermal stability is disposed on a current collector and the negative active material layer is disposed over the thermosetting resin. This improves adhesion of the negative active material layer to the current collector, thereby improving the cycle-life characteristics and safety of the battery.

Figure 1:
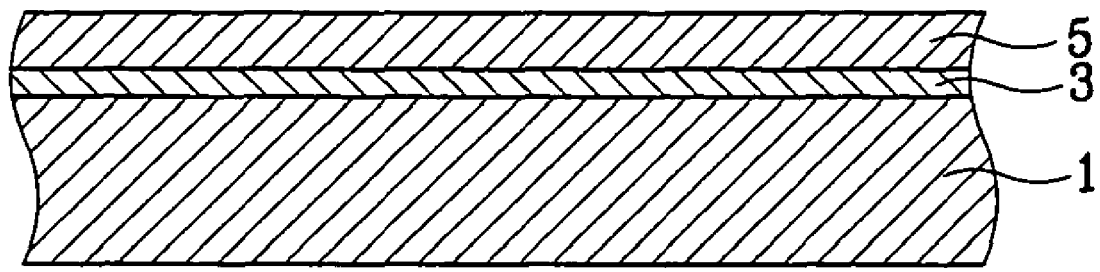
FIG. 1 is a partial cross-sectional view of a negative electrode for a lithium rechargeable battery according to one embodiment of the present invention.

FIG. 1 is a partial cross-sectional view of a negative electrode of a lithium rechargeable battery according to one embodiment of the present invention. However, the negative electrode of the present invention is not limited to the structure illustrated in FIG. 1.

Referring to FIG. 1, the negative electrode includes a current collector 1, a thermosetting resin layer 3, and a negative active material layer 5.

Nonlimiting examples of suitable current collectors 1 include copper foils, nickel foils, stainless steel foils, titanium foils, nickel foams, copper foams, polymer substrates coated with conductive metals, and combinations thereof. In one embodiment the current collector is selected from copper foils and nickel foils.

Nonlimiting examples of suitable polymer substrates include polyethylene terephthalate, polyimide, polytetrafluoroethylene, polyethylene naphthalate, polypropylene, polyethylene, polyester, polyvinylidene fluoride, polysulfone, and mixtures thereof.

The thermosetting resin layer 3 includes a thermosetting resin, nonlimiting examples of which include polyimide, polyurethane, epoxy resins, nylon, and combinations thereof. In one embodiment, the thermosetting resin is polyimide. Polyimide is a thermally stable polymer having a high melting point of about 350° C. Polyimide can be prepared using polyamic acid as a precursor.

Polymer substrates also have high chemical resistance and therefore impart improved battery safety when used as a component of the battery.

The thermosetting resin layer may have a thickness ranging from about 0.01 to about 1 μm. In one embodiment, the thickness ranges from about 0.05 to about 0.1 μm. When the thickness of the thermosetting resin layer is less than about 0.01 μm, adhesion of the active material layer to the current collector may be insufficient. When the thickness is greater than about 1 μm, the electro-conductivity of the electrode may decrease.

When a thermosetting resin layer is formed on the current collector, metal ions within the current collector diffuse into the thermosetting resin layer. The amount of metal ions at the interface between the current collector and the thermosetting resin layer ranges from about 10 to about 1000 ppm based on the total weight of the thermosetting resin layer. This translates to an amount ranging from about 0.001 to about 0.1 wt %. In one embodiment, the amount of metal ions ranges from about 20 to about 500 ppm (i.e. about 0.005 to about 0.05 wt %).

When the amount of metal ions is less than about 0.001 wt %, the adhesion of the thermosetting resin layer decreases due to the low surface roughness of the current collector. When the amount of the metal ions is more than about 0.001 wt %, the current collector can be over-transformed, causing problems in shaping the electrode.

On the other hand, as the metal ions diffused into the thermosetting resin layer move from the interface between the current collector and the thermosetting resin layer to the interface of the thermosetting resin layer and the active material layer, their concentration decreases by an amount ranging from about 1 to about 20 ppm/nm based on the total weight of the thermosetting resin layer (i.e. about 0.0001 to about 0.002 wt %/nm), forming a concentration gradient. The weight ratio of the metal ions at the interface between the current collector and the thermosetting resin layer and other metal ions at the interface between the thermosetting resin layer and the active material layer ranges from about 100:1 to bout 1.5:1. In one embodiment, the weight ratio ranges from about 10:1 to about 2:1.

When the weight ratio of metal ions at the two interfaces is within the above range, the current collector has sufficient surface roughness. When the weight ratio is outside the above range, the current collector has insufficient surface roughness or transformation.

In addition, metal ions diffused into the thermosetting resin layer react on the thermosetting resin, forming metal compounds. The metal compounds increase surface roughness at the interface between the current collector and thermosetting resin layer, subsequently increasing adhesion of the current collector to the negative active material layer.

The surface roughness (Ra) at the interface between the current collector and thermosetting resin layer ranges from about 0.01 to 5 μm. In one embodiment, the surface roughness ranges from about 0.05 to about 2 μm. When the surface roughness is less than about 0.01 μm, the current collector has insufficient adhesion. When the surface roughness is greater than about 5 μm, shaping of the electrode becomes difficult.

The negative active material layer includes a negative active material comprising a compound capable of reversibly absorbing and emitting lithium (i.e. a compound that can be electrochemically oxidized and reduced and thereby reversibly intercalate and deintercalate lithium). Nonlimiting examples of suitable negative active materials include lithium, metallic materials that can be alloyed with lithium, and composite materials including carbonaceous materials and metallic materials.

Nonlimiting examples of suitable metallic materials capable of being alloyed with lithium include Al, Si, Sn, Pb, Zn, Bi, In, Mg, Ga, Cd, Ag, Ge, Ti, and combinations thereof. In addition, the negative active material can include metallic lithium.

Nonlimiting examples of suitable carbonaceous materials include artificial graphite, natural graphite, graphitizable carbon fiber, graphitizable mesocarbon microbeads, amorphous carbon, and the like.

Nonlimiting examples of suitable amorphous carbons include soft carbon (low temperature fired carbon) and hard carbon (high temperature fired carbon). Nonlimiting examples of suitable crystalline carbons include plate-shaped natural or artificial graphite, spherical natural or artificial graphite, and fiber-shaped natural or artificial graphite.

In addition, the negative active material layer may include a binder selected from polyvinyl chloride, polyvinyl difluoride, polymers including ethylene oxide, polymethyl methacrylate, polyvinyl alcohol, carboxylated polyvinylchloride, polyvinylidene fluoride, polyimide, polyurethane, epoxy resin, nylon, styrene-butadiene rubbers, and acrylated styrene-butadiene rubbers.

The negative active material layer may have a thickness ranging from about 20 to about 200 μm. In one embodiment, the negative active material layer has a thickness ranging from about 50 to about 100 μm. When the negative active material layer has a thickness of less than about 20 μm, the electrode has fewer pores, thereby significantly increasing the volume of the substrate. When the negative active material layer has a thickness of greater than about 200 μm, electron and ion conductivity decreases, resulting in deteriorated battery performance.

According to another embodiment of the present invention, a method of preparing a negative electrode for the lithium rechargeable battery includes forming a thermosetting resin layer on a current collector by coating a composition for forming the thermosetting resin layer on the current collector. The negative electrode is prepared by coating a negative active material slurry on the thermosetting resin layer and shaping the electrode.

The composition for forming the thermosetting resin layer is coated on the current collector by wet-coating and then dried to form the thermosetting resin layer.

The thermosetting resin and the current collector are as described above.

The thermosetting resin is present in the composition for forming the thermosetting resin layer in an amount ranging from about 1 to about 50 wt % based on the total weight of the composition. In one embodiment, the thermosetting resin is present in the composition in an amount ranging from about 10 to about 40 wt % based on the total weight of the composition. When the thermosetting resin is present in the composition an amount less than about 1 wt %, the coating slurry has low viscosity. When the thermosetting resin is present in the composition in an amount greater than about 50 wt %, the coating slurry has an excessively high viscosity such that it becomes difficult to control thickness.

The current collector and thermosetting resin are as described above.

Nonlimiting examples of suitable methods for wet-coating the composition for forming the thermosetting resin layer may include screen printing, spray coating, coating with a doctor blade, gravure coating, dip coating, silk screening, and painting.

A negative active material powder is mixed with a solvent to prepare a negative active material slurry. The slurry is coated on the thermosetting resin layer and then dried and shaped into a sheet-shape, a flat disk shape, or the like to complete the negative electrode for the lithium rechargeable battery.

The negative active material is as described above. The active material layer may be formed by slurry coating.

The solvent in the negative active material slurry may include water, an organic solvent, or a mixture thereof. Nonlimiting examples of suitable organic solvents include methanol, ethanol, alcohols such as isopropanol, hexane, chloroform, tetrahydrofuran, ether, methylene chloride, acetone, acetonitrile, N-methyl pyrrolidone (NMP), and the like.

According to another embodiment of the present invention, a lithium rechargeable battery includes an inventive negative electrode, a positive electrode including a positive active material, and an electrolyte.

Lithium rechargeable batteries are classified as lithium ion batteries, lithium ion polymer batteries, or lithium polymer batteries depending on the type of separator and electrolyte used. The lithium rechargeable battery can be cylindrical, prismatic, coin-type, or pouch shaped. Lithium rechargeable batteries are also classified as bulk-type or thin membrane type, depending on size.

The structure of the lithium rechargeable battery and the method of preparing it are generally known in the art.

Figure 2:
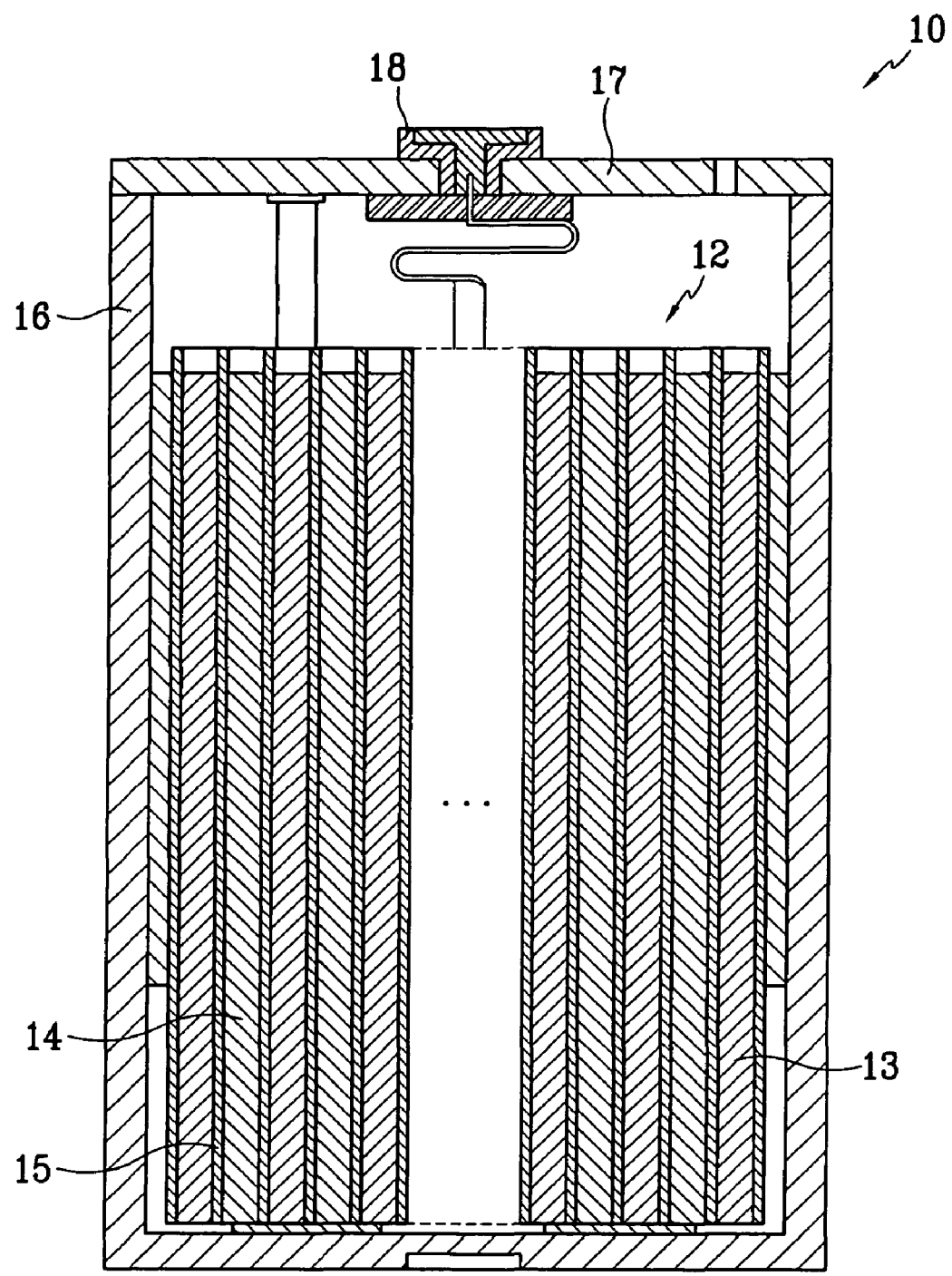
FIG. 2 is a cross-sectional view of a lithium rechargeable battery according to one embodiment of the present invention.

FIG. 2 is a cross-sectional view of a lithium rechargeable battery according to one embodiment of the present invention. Referring to FIG. 2, a lithium rechargeable battery 10 is fabricated by housing an electrode assembly 12 in a case 16, injecting an electrolytic solution into the case 16, and sealing the case 16 with a cap plate 17 and sealing gasket 18. The electrode assembly 12 includes a positive electrode 13, a negative electrode 14, and a separator 15 positioned between the positive and negative electrodes.

The negative electrode is as described above.

The positive electrode is prepared by mixing a positive active material powder with a binder (such as polyvinylidene fluoride or the like) and a conductive agent (such as carbon black or the like). The mixture is then formed into a sheet-shape, a flat disk shape, or the like. Alternatively, the positive active material powder can be formed into a sheet-shape, a flat disk shape, or the like and then stacked on a current collector.

The positive active material may include a material capable of reversibly intercalating or deintercalating lithium (i.e. lithiated intercalation compounds) or a compound that reversibly reacts with lithium to form a lithium-containing compound. In one embodiment, the positive active material includes at least one composite oxide of lithium and at least two selected from cobalt, manganese, and nickel.

In one embodiment, the positive active material includes a lithium-containing compound selected from compounds represented by the following Formulae 1 through 13.

i) $Li_xMn_{1-y}M_yA_2$  (1)

ii) $Li_xMn_{1-y}M_yO_{2-z}X_z$  (2)

iii) $Li_xMn_2O_{4-z}X_z$ (3)

iv) $Li_xMn_{2-y}M_yA_4$ (4)

v) $Li_xCo_{1-y}M_yA_2$ (5)

vi) $Li_xCo_{1-y}O_{2-z}X_z$ (6)

vii) $Li_xNi_{1-y}M_yA_2$ (7)

viii) $Li_xNi_{1-y}O_{2-z}X_z$ (8)

ix) $Li_xNi_{1-y}Co_yO_{2-z}X_z$ (9)

x) $Li_xNi_{1-y-z}Co_yM_zA_a$ (10)

xi) $Li_xNi_{1-y-z}Co_yM_zO_{2-a}X_a$ (11)

xii) $Li_xNi_{1-y-z}Mn_yM_zA_a$ (12)

xiii) $Li_xNi_{1-y-z}Mn_yM_zO_{2-a}X_a$ (13)

In the above Formulae 1 through 13, $0.9 \leq x \leq 1.1$, $0 \leq y \leq 0.5$, $0 \leq z \leq 0.5$, $0 \leq a \leq 2$. M is selected from the group consisting of Al, Ni, Co, Mn, Cr, Fe, Mg, Sr, V, rare earth elements, and combinations thereof. A is an element selected from the group consisting of O, F, S, P, and combinations thereof. X is selected from the group consisting of F, S, or P.

The positive active material may alternatively include a sulfur-based material selected from the group consisting of elemental sulfur, $Li_2S_n$ (where $n \geq 1$), $Li_2S_n$ (where $n \geq 1$) dissolved in a catholyte, organo sulfur compounds, and carbon-sulfur polymers $(C_2S_x)_n$ (wherein x=2.5 to 50, $n \geq 2$).

In one embodiment, the lithium rechargeable battery may include a non-aqueous electrolyte or a solid electrolyte. The non-aqueous electrolyte may include a lithium salt dissolved in a non-aqueous organic solvent. The lithium salt acts as a supply source of lithium ions in the battery, making the basic operation of the lithium battery possible. Nonlimiting examples of suitable lithium salts include $LiPF_6$, $LiBF_4$, $LiSbF_6$, $LiAsF_6$, $LiClO_4$, $LiCF_3SO_3$, $LiN(CF_3SO_2)_2$, $LiN(C_2F_5SO_2)_2$, $LiAlO_4$, $LiAlCl_4$, $LiN(C_xF_{2x+1}SO_2)(C_yF_{2y+1}SO_2)$ (where x and y are natural numbers), $LiSO_3CF_3$, and mixtures thereof. According to one embodiment, the lithium salt includes $LiBF_4$. In another embodiment, the lithium salt includes a mixture of $LiPF_6$ and $LiBF_4$.

The concentration of the lithium salt ranges from about 0.6 to about 2.0 M. In one embodiment, the concentration of the lithium salt ranges from about 0.7 to about 1.6 M. When the concentration of the lithium salt is less than about 0.6 M, electrolyte performance deteriorates due to its ionic conductivity. When the concentration of the lithium salt is greater than about 2.0 M, lithium ion mobility decreases due to an increase in electrolyte viscosity.

The non-aqueous organic solvent serves as a medium mobilizing the ions that are capable of participating in the electrochemical reaction. The non-aqueous organic solvent may include a carbonate-based, ester-based, ether-based, or ketone-based solvent.

Nonlimiting examples of suitable carbonate-based solvents include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), ethylene carbonate (EC), propylene carbonate (PC), butylene carbonate (BC), and the like.

Nonlimiting examples of suitable ester-based solvents include n-methyl acetate, n-ethyl acetate, n-propyl acetate, and the like.

According to one embodiment of the present invention, the solvent includes a mixture of cyclic and chain carbonates. The volume ratio of cyclic carbonates to chain carbonates ranges from about 1:1 to about 1:9. When the volume ratio of cyclic carbonates to chain carbonates ranging from about 1:1 to about 1:9 is used and the mixture is used as an electrolyte, electrolyte performance is enhanced.

In addition, the electrolyte may further include mixtures of carbonate-based solvents and aromatic solvents. Nonlimiting examples of suitable aromatic solvents include benzene, fluorobenzene, toluene, trifluorotoluene, xylene, and mixtures thereof. The volume ratio of carbonate-based solvents to aromatic solvents ranges from about 1:1 to about 30:1. When the volume ratio of carbonate-based solvents to aromatic solvents is within this volume ratio and the mixture is used as an electrolyte, electrolyte performance is enhanced.

The aromatic solvent may be an aromatic compound represented by the following Formula 14.

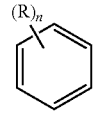

(14)

In the above Formula 14, n is an integer ranging from 0 to 6 and R is selected from the group consisting of halogen atoms, C1 to C10 alkyl groups, and combinations thereof.

Nonlimiting examples of suitable aromatic solvents include benzene, fluorobenzene, toluene, fluorotoluene, trifluorotoluene, xylene, and mixtures thereof.

The non-aqueous electrolyte may further include an overcharge inhibition additive.

Nonlimiting examples of suitable solid electrolytes include polymer electrolytes (such as polyethylene oxide), polymer electrolytes comprising at least one polyorganosiloxane or polyoxyalkylene side chain, sulfide electrolytes (such as $Li_2S$—$SiS_2$, $Li_2S$—$GeS_2$, $Li_2S$—$P_2S_5$, $Li_2S$—$B_2S_3$, and the like), and inorganic electrolytes (such as $Li_2S$—$SiS_2$—$Li_3PO_4$, $Li_2S$—$SiS_2$—$Li_3SO_4$, and the like).

The lithium battery may further include a separator positioned between the positive electrode and the negative electrode. The separator may include one or more layers of a compound selected from polyethylene, polypropylene, and polyvinylidene fluoride. Alternatively, the separator may be a multi-layer separator. Nonlimiting examples of suitable multi-layer separators include polyethylene/polypropylene two-layered separators, polyethylene/polypropylene/polyethylene three-layered separators, polypropylene/polyethylene/polypropylene three-layered separators, and the like.

According to one embodiment of the present invention, the thermosetting resin layer is formed on a current collector. Metal ions in the current collector are diffused into the thermosetting resin layer, resulting in a concentration gradient of metal ions. The diffused metal ions react with the thermosetting resin to form metal compounds. Accordingly, the surface roughness at the interface between the current collector and thermosetting resin layer increases, thereby improving adhesion of the negative active material layer and improving the cycle-life characteristics and safety of the battery.

The following examples illustrate the present invention in more detail. However, these examples are provided for illustrative purposes only, and it is understood that the present invention is not limited by these examples.

Example 1

4.5 g of silicon as a negative active material was added to 3 g of N-methylpyrrolidone as a solvent to prepare a negative active material slurry.

0.5 g of polyamic acid (which is a precursor of polyimide resin) was dissolved in 2 g of N-methylpyrrolidone, obtaining a thermosetting resin composition. The thermosetting resin composition was coated on a copper foil current collector by screen printing and then dried to form a 1 μm-thick thermosetting resin layer.

Then, the negative active material slurry was coated on the thermosetting resin layer. The resulting current collector was dried at 90° C. and compressed to prepare a negative electrode.

Example 2

Polyvinylidene fluoride as a binder and silicon as a negative active material were added to an N-methylpyrrolidone solvent to prepare a negative active material slurry. The weight ratio of the negative active material to the binder was 95:5.

Next, a thermosetting resin composition was prepared by dissolving 0.5 g of polyamic acid in 2 g of N-methylpyrrolidone. The thermosetting resin composition was then coated on a copper foil current collector by screen printing and dried to form a 1 μm-thick thermosetting resin layer.

Then, the negative active material slurry was coated on the thermosetting resin layer, dried at 90° C., and then compressed to prepare a negative electrode.

Comparative Example 1

A negative active material slurry was prepared by adding polyvinylidene fluoride as a binder and silicon as a negative active material to an N-methylpyrrolidone solvent. The weight ratio of the negative active material to the binder was 95:5. The slurry was coated on a copper foil current collector, dried at 90° C., and then compressed to prepare a negative electrode.

Comparative Example 2

A negative electrode was fabricated as in Comparative Example 1, except that the weight ratio of the negative active material to the binder was 90:10.

A peeling test was performed (ASTM D903 method) on the negative electrodes prepared according to Examples 1 and 2 and Comparative Examples 1 and 2 in order to examine the strength of adhesion to the current collector. The results are shown in Table 1 below and in FIG. 3.

In table 1. the strength of adhesion is reported as a percentage and is based on the strength required to peel the negative active material layer from the current collector. The percentages are relative to the strength required to peel the negative active material layer from the current collector prepared in Comparative Example 1 (which includes only a polyvinylidene fluoride binder). Accordingly, the strength of adhesion for Comparative Example 1 is reported as 100%.

TABLE 1

|  | Adhesion Strength (%) |
|---|---|
| Example 1 | 800 |
| Example 2 | 850 |
| Comparative Example 1 | 100 |
| Comparative Example 2 | 110 |

Figure 3:
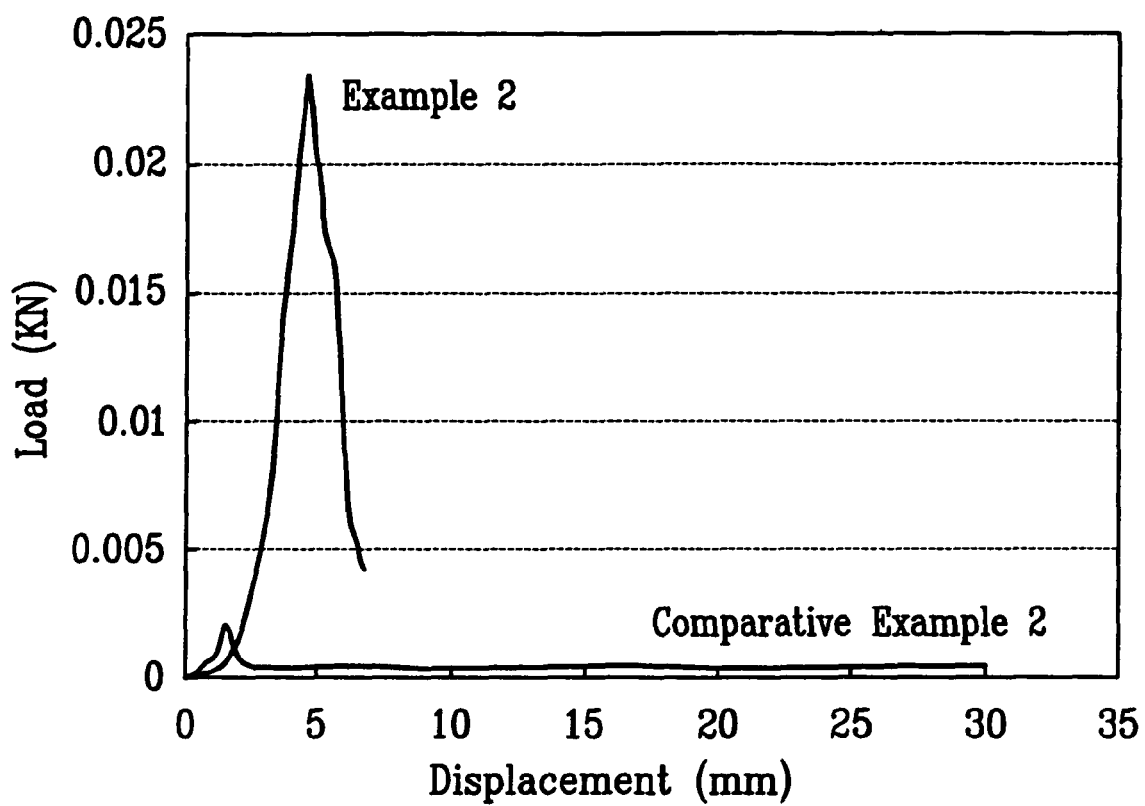
FIG. 3 is a graph showing the adhesion in the negative electrodes of the lithium rechargeable batteries prepared according to Example 2 and Comparative Example 2.

FIG. 3 is a graph showing the strength of adhesion of the negative electrode in the lithium rechargeable battery cells of Example 2 and Comparative Example 2.

As shown in Table 1 and FIG. 3, the negative electrodes fabricated by coating the thermosetting resins of Examples 1 and 2 had greater strengths of adhesion than that of Comparative Example 1. The negative electrodes fabricated by coating the thermosetting resins of Examples 1 and 2 also had greater strengths of adhesion than that of Comparative Example 2 (which was fabricated using a larger amount of binder than Comparative Example 1). Therefore, the thermosetting resin used in the batteries of Examples 1 and 2 resulted in greater strengths of adhesion than the binders used in the batteries of Comparative Examples 1 and 2, resulting in excellent cycle-life of the battery cells.

Furthermore, Example 2 included a smaller amount of polyvinylidene fluoride than Comparative Example 2, thereby reducing the irreversible capacity imparted by the fluorine group included in the polyvinylidene fluoride. Accordingly, a battery cell including a negative electrode according to Example 2 has higher cell efficiency than one including a negative electrode according to Comparative Example 2. In addition, since cell safety depends on the amount of polyimide, the safety of the cell is improved.

Next, the cycle-life characteristics of the lithium rechargeable battery cells according to Example 2 and Comparative Example 2 were examined. Lithium rechargeable battery cells prepared according to Example 2 and Comparative Example 2 were charged at 0.2 C to 4.2V, and then discharged at 0.2 C to 3.0V. This charge-discharge cycle was repeated 40 times, and discharge capacity was measured. The results are provided in FIG. 4.

Figure 4:
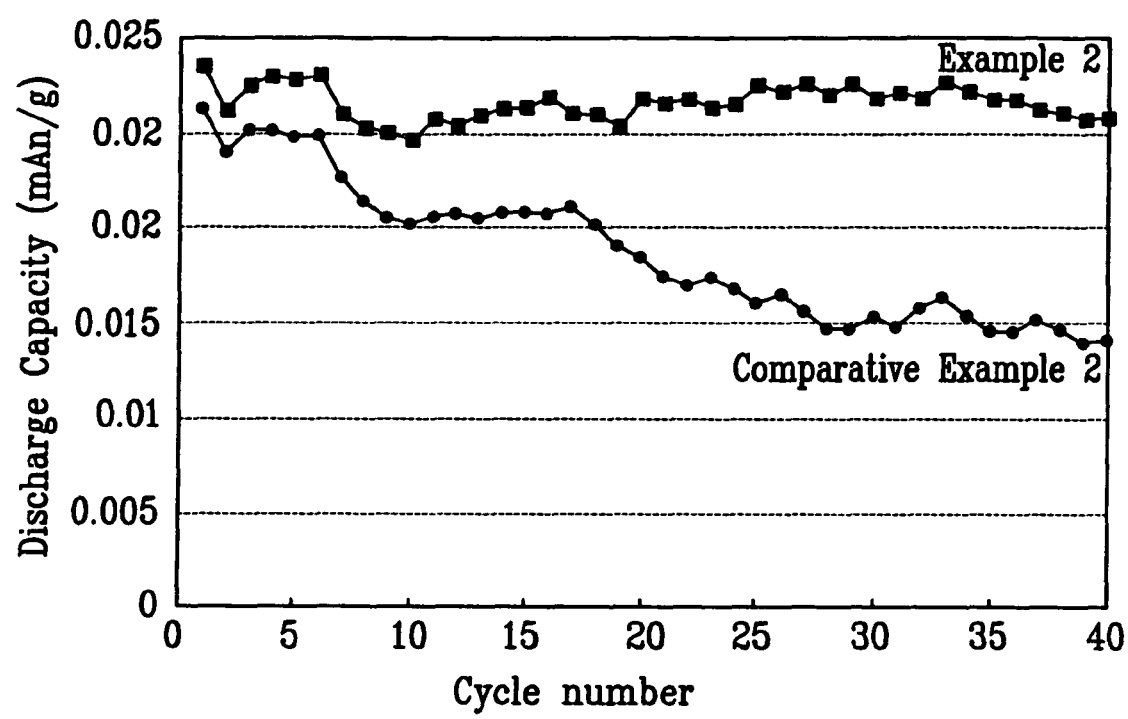
FIG. 4 is a graph showing the cycle-life characteristics of the lithium rechargeable batteries prepared according to Example 2 and Comparative Example 2.

As shown in FIG. 4, the lithium rechargeable battery cell prepared according to Comparative Example 2 had a sharply reduced discharge capacity at the 7$^{th}$ cycle. In contrast, the lithium rechargeable battery cell prepared according to Example 2 (including a thermosetting resin layer) had almost no change in discharge capacity up to the 40$^{th}$ cycle. Accordingly, the lithium rechargeable battery cell prepared according to Example 2 (including a thermosetting resin layer) had excellent cycle-life characteristics.

A negative electrode according to one embodiment of the present invention includes a thermosetting resin layer coated on a current collector, thereby increasing surface roughness at the interface between the current collector and thermosetting resin layer and increasing the strength of adhesion of the negative active material layer to the current collector and a negative active material layer. This improves the cycle-life characteristics and safety of the battery.

While certain embodiments of the present invention have been described for illustrative purposes, those skilled in the art will appreciate that various modifications, additions and substitutions can be made to the described embodiments without departing from the spirit and scope of invention as disclosed in the appended claims.

What is claimed is:

1. A negative electrode for a lithium rechargeable battery, the negative electrode comprising:
 a current collector;
 a thermosetting resin layer on the current collector, wherein the thermosetting resin layer comprises a polyimide resin; and
 a negative active material layer on the thermosetting resin layer, wherein the negative active material is capable of reversibly intercalating/deintercalating lithium, and
 wherein the current collector is configured to diffuse metal ions into the thermosetting resin layer, and wherein the thermosetting resin layer includes the diffused metal ions in a concentration gradient across the thermosetting resin layer in which a concentration of the metal ions at an interface between the current collector and the thermosetting resin layer is greater than a concentration of the metal ions at an interface of the thermosetting resin layer and the negative active material layer.

2. The negative electrode of claim 1, wherein the current collector is selected from the group consisting of copper foils, nickel foils, stainless steel foils, titanium foils, nickel foams, copper foams, polymer substrates coated with conductive metals, and combinations thereof.

3. The negative electrode of claim 1, wherein the thermosetting resin layer has a thickness ranging from about 0.01 to about 1 μm.

4. The negative electrode of claim 1, wherein the concentration of metal ions at the interface between the current collector and the thermosetting resin layer ranges from about 0.001 to about 0.1 wt % based on the total weight of the thermosetting resin layer.

5. The negative electrode of claim 1, wherein the concentration of metal ions in the thermosetting resin layer decreases from the interface between the current collector and the thermosetting resin layer to the interface of the thermosetting resin layer and the active material layer at a rate of decrease ranging from about 0.0001 to about 0.002 wt %/nm.

6. The negative electrode of claim 1, wherein a weight ratio of metal ions at the interface between the current collector and the thermosetting resin layer and metal ions at the interface between the thermosetting resin layer and the active material layer ranges from about 100:1 to about 1.5:1.

7. The negative electrode of claim 1, wherein the thermosetting resin layer comprises a metal compound reactant of the metal ions in the current collector and the thermosetting resin.

8. The negative electrode of claim 1, wherein a surface roughness (Ra) at the interface between the current collector and the thermosetting resin layer ranges from about 0.01 to about 5 μm.

9. The negative electrode of claim 1, wherein the negative active material layer comprises a negative active material selected from the group consisting of lithium, metallic materials capable of alloying with lithium, and composite materials of carbonaceous materials and metallic materials capable of alloying with lithium.

10. The negative electrode of claim 9, wherein the negative active material layer further comprises a binder selected from the group consisting of polyvinyl chloride, polyvinyl difluoride, polymer, polymethylmethacrylate, polyvinylalcohol, carboxylated polyvinylchloride, polyvinylidenefluoride, polyimide, polyurethane, epoxy resin, nylon, styrene-butadiene rubbers, acrylated styrene-butadiene rubbers, and combinations thereof.

11. The negative electrode of claim 1, wherein the negative active material layer has a thickness ranging from about 20 to about 200 μm.

12. A method for preparing a negative electrode for a lithium rechargeable battery, the method comprising:
 coating a composition for forming a thermosetting resin layer on a current collector to form a thermosetting resin layer, the thermosetting resin layer comprising a polyimide resin, wherein the current collector diffuses metal ions into the thermosetting resin layer so that the thermosetting resin layer includes the diffused metal ions in a concentration gradient across the thermosetting resin layer in which a concentration of the metal ions at an interface between the current collector and the thermosetting resin layer is greater than a concentration of the metal ions at an interface of the thermosetting resin layer and a negative active material layer; and
 coating a negative active material slurry on the thermosetting resin layer wherein the negative active material slurry comprises a negative active material capable of reversibly intercalating/deintercalating lithium.

13. The method of claim 12, wherein the composition for forming a thermosetting resin layer comprises a thermosetting resin present in an amount ranging from about 1 to about 50 wt % based on the total weight of the composition.

14. A lithium rechargeable battery comprising:
 a negative electrode comprising
  a current collector,
  a thermosetting resin layer on the current collector, wherein the thermosetting resin layer comprises a polyimide resin, and
  a negative active material layer on the thermosetting resin layer, wherein the negative active material is capable of reversibly intercalating/deintercalating lithium, and wherein the current collector is configured to diffuse metal ions into the thermosetting resin layer, and wherein the thermosetting resin layer includes the diffused metal ions in a concentration gradient across the thermosetting resin layer in which a concentration of the metal ions at an interface between the current collector and the thermosetting resin layer is greater than a concentration of the metal ions at an interface of the thermosetting resin layer and the negative active material layer;
 a positive electrode comprising a positive active material; and
 an electrolyte.

15. The negative electrode of claim 14, wherein the thermosetting resin layer has a thickness ranging from about 0.01 to about 1 μm.

16. The negative electrode of claim 14, wherein a surface roughness (Ra) at the interface between the current collector and the thermosetting resin layer ranges from about 0.01 to about 5 μm.

* * * * *